UNITED STATES PATENT OFFICE.

ISAAC REESE, OF PITTSBURG, PENNSYLVANIA.

MANUFACTURE OF HIGHLY REFRACTORY SILICA BRICK.

SPECIFICATION forming part of Letters Patent No. 309,250, dated December 16, 1884.

Application filed April 2, 1884. (No specimens.)

*To all whom it may concern:*

Be it known that I, ISAAC REESE, a citizen of the United States, and a resident of Pittsburg, in the county of Allegheny and State of Pennsylvania, have invented a certain new and useful Improvement in the Manufacture of Refractory Silica Brick; and I do hereby declare the following to be a full, clear, and exact description thereof.

My invention relates to the manufacture of hard, dense, strong, and highly refractory silica brick, tuyeres, and lining-shapes; and its objects are to produce a refractory material adapted to withstand the rough handling incidental to transportation, and at the same time be thoroughly adapted to withstand the high temperatures employed in conducting open-hearth and Bessemer operations.

Up to the present time, so far as I am aware, manufacturers have never succeeded in this country in producing silica lining-shapes adapted to withstand transportation and be capable of practical use in open hearths, Bessemer converters, and other refining-chambers subject to intense and prolonged temperatures, and up to the present time the only bricks of such character placed in the market have been imported at great expense from abroad. It is true many attempts have been made to produce strong silica bricks; but in all cases where highly-refractory compositions were used the products were extremely friable, and, on the other hand, in all cases where a strongly-cohesive brick was formed it was due to the presence of such large proportions of fusible binding substances that the bricks were not up to the high refractory standard required. Now, I have discovered that a stronger and more highly refractory brick than any heretofore made may be produced by the use of a certain silica composition when subjected to treatment in the manner which I shall now describe. I take one hundred parts of silica-rock, place it in a pan, and grind it in the usual manner. From one-half to two and one-half parts of slaked lime and from one to four and a-half per cent. of alumina are then added. These proportions of lime and alumina vary within these limits in order to obtain the required strength in different shapes of brick, tuyeres, lining-shapes, &c., without impairing the high refractory nature of the article produced. In general practice, however, their proportions should always be kept down as low as possible, and must not in any instance exceed the limits specified, as otherwise the material will fuse or run down during burning at the high and prolonged temperature it is subsequently subjected to. Care must also be had that the rock is almost all pure silica— say ninety-eight to ninety-eight and a half per cent. of silica and the balance iron and alumina. When the ingredients have been mixed in the proportions specified, the whole mass is thoroughly kneaded and mixed together until it is in a proper condition for molding. The material is then molded in the usual manner into bricks, tuyeres, and lining-shapes, which are dried and conveyed to the burning-kiln in the usual manner.

In burning, a bee-hive kiln provided with a considerable number of fire-chambers is used. When the kiln is fully charged, all apertures about it must be carefully closed to prevent the admission of any cold-air currents into its interior during the burning operation. This is necessary in order to prevent the material from crumbling down during burning, and because it is impossible to produce a strong silica brick or shape if it is not done. The kiln now being in proper condition, the fires are urged until the temperature reaches the highest possible point, and this is maintained by careful, regular, and repeated firing for a period ranging from one hundred and thirty to one hundred and ninety hours. The temperature during this period should be maintained at a uniform heat sufficiently high to cause the lining materials to glow vividly at an intense white heat, and it must be high enough to melt down ordinary fire-brick. Preferably, it should be so great as to cause the silica shapes to glow with an intense white light approximating to that given off by the side walls and linings of an open-hearth furnace during open-hearth refining operations.

Samples may be withdrawn and tested during the close of the burning operation. If they are not burned sufficiently, they emit on percussion a dead sound, but give a clear jingle or almost metallic sound when indurated, set, hardened, and strengthened to the desired degree.

The advantages of my improvement are, first, the bricks, tuyeres, and lining-shapes are extremely hard, dense, strong, and are capable of withstanding the rough usage incidental to transportation and handling; secondly, they are superior to any made or imported into this country, in that they are uniformly of the highest refractory nature, and are not subject to crack, spall off, or break in use.

I am aware that Patent No. 393, of 1837, describes a brick formed of equal parts of silica and clay; that Patent No. 20,433 describes mixing the silica with three per cent. of quicklime; that Patent No. 147,642 describes mixing the silica with ten per cent. of clay and one per cent. of quicklime; that Patent No. 165,049 describes mixing the silica with about twenty-five per cent. of fire-clay; that Patent No. 170,502 mixes silica with about ten per cent. of lime; that Patent No. 202,637 mixes silica with seventeen per cent. of alumina, mica, iron, and lime, and that Patents Nos. 218,334 and 295,321 make a brick with less than one-sixth of silica; but none of them describe the burning of the shaped bricks in an air-tight kiln or maintaining them at a glowing white heat during one hundred and thirty to one hundred and ninety hours; nor do either of them describe such a compound as would stand such treatment without fusing and running; hence

What I claim as new and of my invention is—

The described method of making silica-brick or refractory linings, which consists in mixing the silica with the specified small proportion of lime and alumina; secondly, burning the molded shapes in an air-tight kiln; and, thirdly, maintaining the temperature in said air-tight kiln for one hundred and thirty to one hundred and ninety hours at such an elevation as will melt an ordinary fire-brick, substantially as described.

ISAAC REESE.

Witnesses:
FRANK M. REESE,
JACOB REESE.